US005970449A

United States Patent [19]

Alleva et al.

[11] Patent Number: 5,970,449

[45] **Date of Patent: *Oct. 19, 1999**

[54] TEXT NORMALIZATION USING A CONTEXT-FREE GRAMMAR

[75] Inventors: Fileno A. Alleva, Redmond; Michael J. Rozak, Issaquah; Larry J. Israel, Bellevue, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,117

[22] Filed: Apr. 3, 1997

[51] Int. Cl.[6] .......... G10L 7/08

[52] U.S. Cl. .......... 704/235; 704/257

[58] Field of Search .......... 704/235, 273, 704/243, 231, 9, 251, 260, 200, 255, 257, 270, 272

[56] References Cited

U.S. PATENT DOCUMENTS

| | | | |
|---|---|---|---|
| 4,829,576 | 5/1989 | Porter | 704/235 |
| 4,914,704 | 4/1990 | Cole et al. | 704/235 |
| 5,231,670 | 7/1993 | Goldhor et al. | 704/275 |
| 5,349,526 | 9/1994 | Potts, Sr. et al. | 364/419.1 |
| 5,357,596 | 10/1994 | Takebayashi et al. | 704/275 |
| 5,371,807 | 12/1994 | Register et al. | 704/9 |
| 5,615,378 | 3/1997 | Nishino et al. | 395/754 |
| 5,632,002 | 5/1997 | Hashimoto et al. | 704/231 |
| 5,651,096 | 7/1997 | Pallakoff et al. | 704/275 |
| 5,715,370 | 2/1998 | Luther et al. | 704/275 |

OTHER PUBLICATIONS

DragonDictate for Windows User's Guide, "Changing Text with Scratch That", Dragon Systems, Chapter 3: Dictating Text into Applications, pp. 46–55, 1996.

"Handling Names and Numerical Expressions in an N–Gram Language Model", IBM Technical Disclosure Bulletin, vol. 37, No. 10, pp. 297–298, Oct. 1994.

IEEE Multimedia; Hemphill et al, "Speech Aware Multimedia", pp. 74–78, Spr. 96.

*Primary Examiner*—Richemond Dorvil

*Attorney, Agent, or Firm*—Westman, Champlin & Kelly, P.A.

[57] ABSTRACT

A text normalizer normalizes text that is output from a speech recognizer. The normalization of the text produces text that is less awkward and more familiar to recipients of the text. The text may be normalized to include audio content, video content, or combinations of audio and video contents. The text may also be normalized to produce a hypertext document. The text normalization is performed using a context-free grammar. The context-free grammar includes rules that specify how text is to be normalized. The context-free grammar may be organized as a tree that is used to parse text and facilitate normalization. The context-free grammar is extensible and may be readily changed.

50 Claims, 16 Drawing Sheets

TEXT NORMALIZATION USING A CONTEXT-FREE GRAMMAR

TECHNICAL FIELD

The present invention relates generally to data processing systems, and more particularly, to text normalization using a context-free grammar.

BACKGROUND OF THE INVENTION

Speech recognizers have gained popularity in recent years. A speech recognizer typically includes software that is run on a computer system to recognize spoken words or phrases. The speech recognizer generally outputs text corresponding to its interpretation of the spoken input. For example, if a speaker speaks the word "dog," the speech recognizer recognizes the spoken word and outputs the text "dog."

Unfortunately, speech recognizers often produced textual output that is awkward or not familiar to recipients. For example, if a speaker speaks the phrase "one hundred forty seven," the speech recognizer outputs "one hundred forty seven" rather than the sequence of digits "147." Similar awkward textual outputs are produced by speech recognizers for inputs that specify dates, times, monetary amounts, telephone numbers, addresses, and acronyms. As a result, the recipient of the textual output is forced to manually edit the text to put it in a more acceptable form. As speech recognizers are being incorporated in document creation software, the inability of the speech recognizers to produce acceptable textual output substantially diminishes the usefulness of such software.

SUMMARY OF THE INVENTION

The present invention overcomes the limitation of prior art speech recognizers by providing a facility for normalizing text. The normalization of text produces output text that is more acceptable to recipients. The normalization may also include the substitution of textual content with non-textual content, such as audio content, video content, or even a hypertext document.

In accordance with a first aspect of the present invention, a method is practiced in a computer system that has a speech recognition engine for recognizing content in an input speech. Text corresponding to speech input is received from the speech recognition engine by the computer system. A context-free grammar is applied to identify substitute content for the received text. The receive text is substituted with the substitute content.

In accordance with another aspect of the present invention, a file is provided in a computer system to set forth rules of a context-free grammar for normalizing text. Text is received from a speech recognizer that recognizes portions of speech in speech input. The text corresponds to speech input. At least a portion of the text is normalized to replace the portion with a normalized alphanumeric string ("alphanumeric" as used in this context is intended to include ASCII and Unicode). The normalizing comprises applying a rule from the context-free grammar to replace the portion of the text being normalized with the normalized alphanumeric string.

In accordance with an additional aspect of the present invention, an application program interface (API) that includes a text normalizer is provided within a computer system. The computer runs an application program and includes a speech recognizer for recognizing portions of speech in speech input and for outputting text that corresponds to the recognized portions of speech. Text is received from the speech recognizer at the text normalizer. The text is normalized by the text normalizer by applying a rule from the context-free grammar to alter contents of the text and produce normalized text. The normalized text is passed to the application program.

In accordance with a further aspect of the present invention, a computer system includes a speech recognizer for recognizing portions of speech in speech input and for producing textual output corresponding to the recognized portions of speech. The computer system also includes a context-free grammar that contains rules for normalizing text and a text normalizer that applies at least one rule from the context-free grammar to normalize textual output from the speech recognizer.

BRIEF DESCRIPTION OF THE DRAWINGS

A preferred embodiment of the present invention will be described below relative to the following figures.

DETAILED DESCRIPTION OF THE INVENTION

The preferred embodiment of the present invention provides a mechanism for normalizing text that is received from a speech recognizer. A context-free grammar is applied to perform the text normalization. The context-free grammar includes a number of rules that specify how the text is to be normalized. These rules are applied to textual output received from the speech recognizer to produce normalized text. In the preferred embodiment of the present invention, the text normalization is performed within an application program interface (API) that may be called by application programs to receive text corresponding to speech input.

The preferred embodiment of the present invention may provide multiple types of text normalization. For example, text may be normalized to produce normalized text. Similarly, text may be normalized to produce different types of media content. Text may be normalized to produce audio content and video content. Text may even be normalized to produce hypertext documents that are substituted for the text.

The context-free grammar utilized in the preferred embodiment of the present invention is extensible. The context-free grammar, as will be described in more detail below, is specified within a text file. This text file may be replaced with a substitute text file that specifies a different context-free grammar. Moreover, the text file may be edited so as to alter the contents of the context-free grammar. As the context-free grammar is specified within a text file, the context-free grammar is human-readable.

Figure 1:
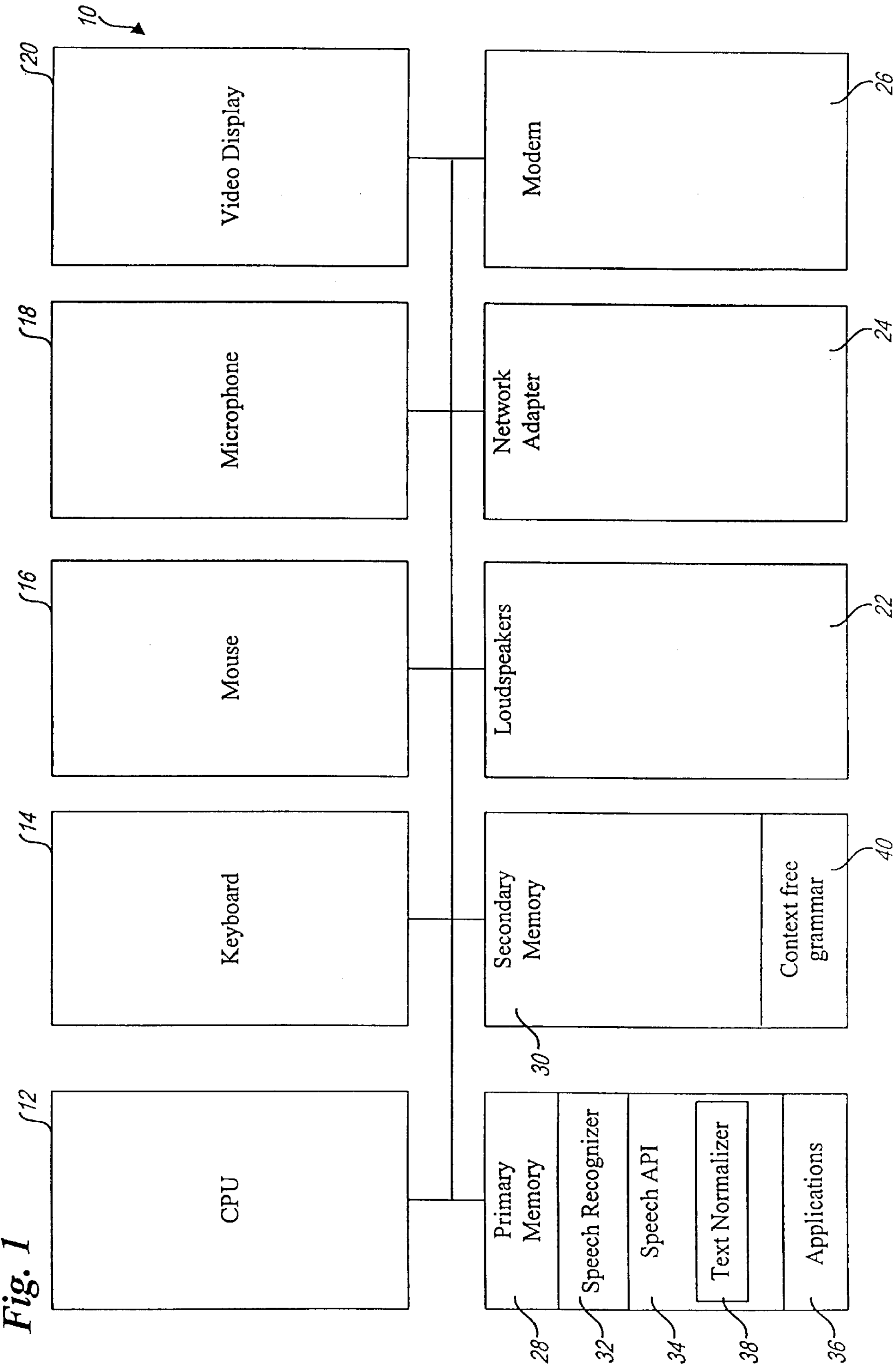
FIG. 1 is a block diagram illustrating a computer system that is suitable for practicing the preferred embodiment of the present invention.

FIG. 1 depicts a computer system 10 that is suitable for practicing the preferred embodiment of the present invention. The computer system 10 includes a central processing unit (CPU) 12 that oversees operations of the computer system. The CPU 12 may be realized by any of a number of different types of microprocessors. The computer system may also include a number of peripheral devices, including a keyboard 14, a mouse 16, a microphone 18, a video display 20, and a loud speaker 22. The microphone 18 may be used to receive speech input from a speaker, and a loud speaker 22 may be used to output audio content, such as speech. The computer system 10 may also include a network adapter 24 for interfacing the computer system with a network, such as a local area network (LAN) or wide area network (WAN). Those skilled in the art will appreciate that a number of different types of network adapters may be utilized in practicing the present invention. The computer system 10 may also include a modem for enabling the computer system to communicate with a remote computing resources over an analog telephone line.

The computer system 10 additionally includes a primary memory 28 and a secondary memory 30. The primary memory may be realized as random access memory (RAM) or other types of internal memory storage known to those skilled in the art. The secondary storage 30 may take the form of a hard disk drive, CD-ROM drive, or other type of secondary storage device. In general, the secondary memory 30 may be realized as a secondary storage device that stores computer-readable removable storage media, such as CD-ROMs.

The primary memory 28 may hold software or other code that constitute a speech recognizer 32. The speech recognizer may take the form of a speech recognition engine and may include ancillary facilities such as a dictionary and alike. A suitable speech recognition engine is described in co-pending application, entitled "Method And System For Speech Recognition Using Continuous Density Hidden Markov Models," application Ser. No. 08/655,273, which was filed on May 1, 1996 and which is explicitly incorporated by reference herein. Those skilled in the art will appreciate that portions of the speech recognizer 32 may also be stored on the secondary memory 30. The primary memory 28 holds a speech application program interface (API) 34 that works with the speech recognizer 32 to produce textual output corresponding to recognized speech within speech input. Application programs 36 may call the speech API 34 to receive the textual output that corresponds to the recognized portions of the speech input. These application programs 36 may include dictation applications, word processing programs, spreadsheet programs and the like. The speech API 34 may include a text normalizer 38 for performing text normalization. The text normalizer 38 is the resource that is responsible for normalizing the text that is received by the speech API 34 from the speech recognizer 32. The types of normalization that are performed by the text normalizer 38 will be described in more detail below.

Those skilled in the art will appreciate that the text normalizer 38 need not be part of the speech API 34 but rather may exist as a separate entity or may be incorporated into the speech recognizer 32. The speech recognizer uses a context-free grammar 40 that is shown in FIG. 1 as being stored in secondary storage 30. Those skilled in the art will appreciate that the context-free grammar 40 may also be stored in primary memory 28.

It should be appreciated that the computer system configuration depicted in FIG. 1 is intended to be merely illustrative and not limiting of the present invention. The present invention may be practiced with other computer system configurations. These other configurations may include fewer components than those depicted in FIG. 1 or may include additional components that differ from those depicted in FIG. 1. Moreover, the present invention need not be practiced on a single processor computer but rather may be practiced in multiprocessor environments, including multiprocessors and distributed systems.

Figure 2:
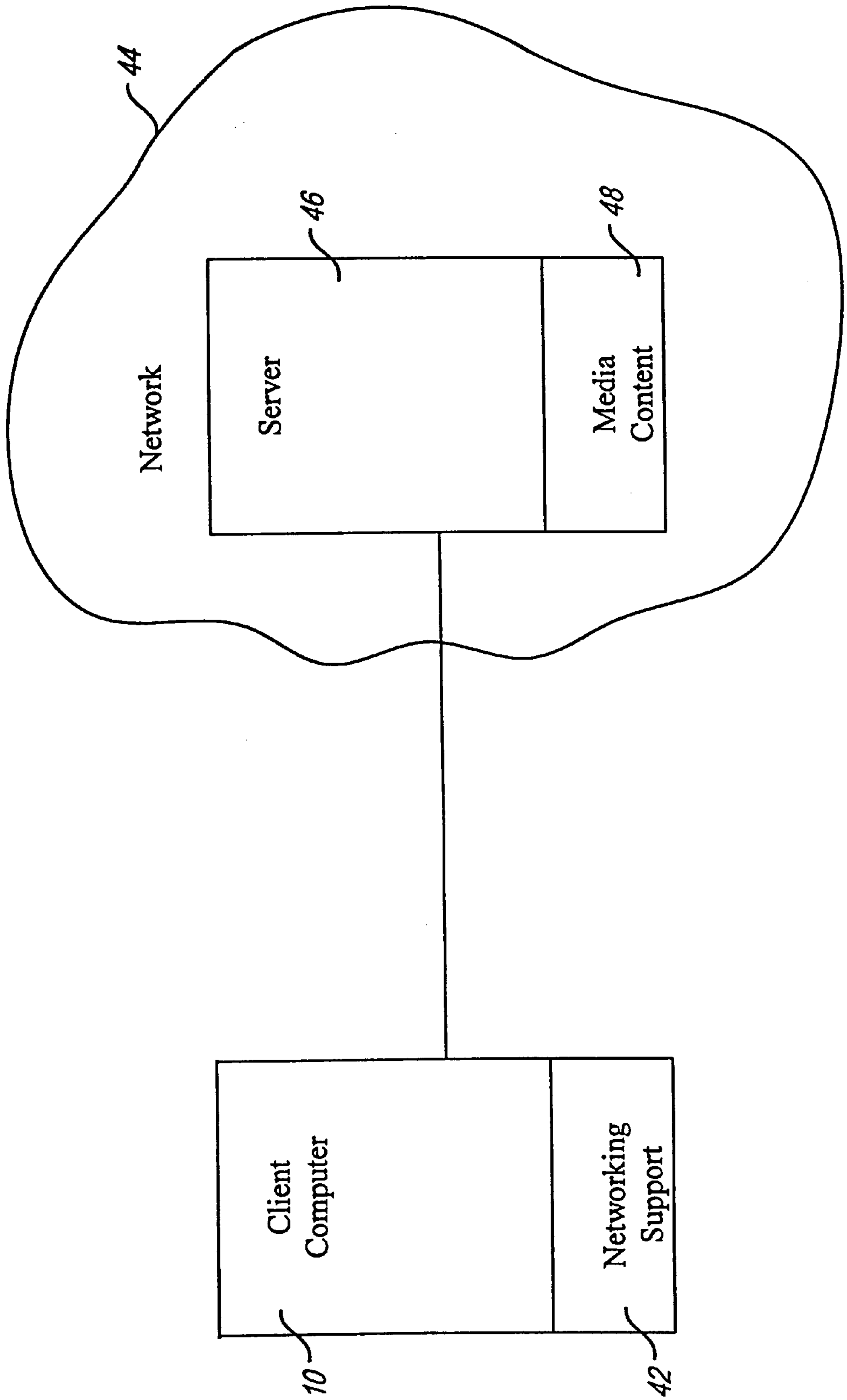
FIG. 2 is a block diagram illustrating a distributed system that is suitable for practicing the preferred embodiment of the present invention.

FIG. 2 depicts an instance where the computer system 10 is a client computer that has access to a network 44. This network 44 may be a LAN or a WAN. The network 44 may be the Internet, an Intranet or an Extranet. The client computer 10 includes networking support 42. This networking support 42 may include client code for a network operating system, a conventional operating system or even a web browser. The networking support 42 enables the client computer 10 to communicate with the server 46 within the network 44. The server 46 may hold media content 48, such as audio data, video data, textual data, or a hypertext document that is to be used by the client computer 10 in normalizing text.

Figure 3A:
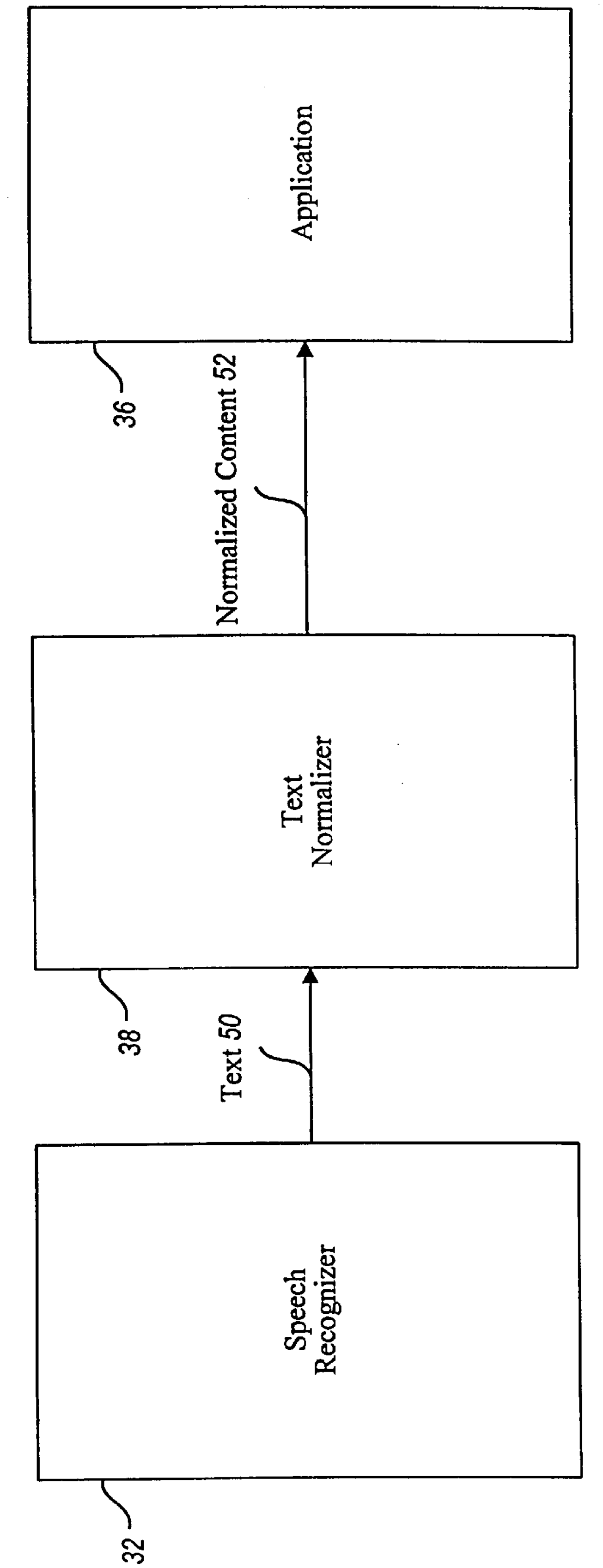
FIGS. 3A–3E illustrate the data flow between the speech recognizer, the text normalizer, and the application programs for different types of normalization.

As was mentioned above, the text normalizer 38 normalizes the text received from the speech recognizer 32 to produce normalized content. FIG. 3A depicts the flow of data between the speech recognizer 32, the text normalizer 38, and an application program 36. In general, the speech recognizer 32 outputs text 50 that corresponds to recognized portions of speech within speech input received via the microphone 18 or stored in secondary storage 30. The text 50 may output a word at a time to the text normalizer 38. Nevertheless, those skilled in the art will appreciate that the granularity of textual output produced by the speech recognizer 32 may vary and may include letters or even phrases. The text normalizer 38 produces normalized content 52 that it passes on to an application program 36.

Figure 3B:
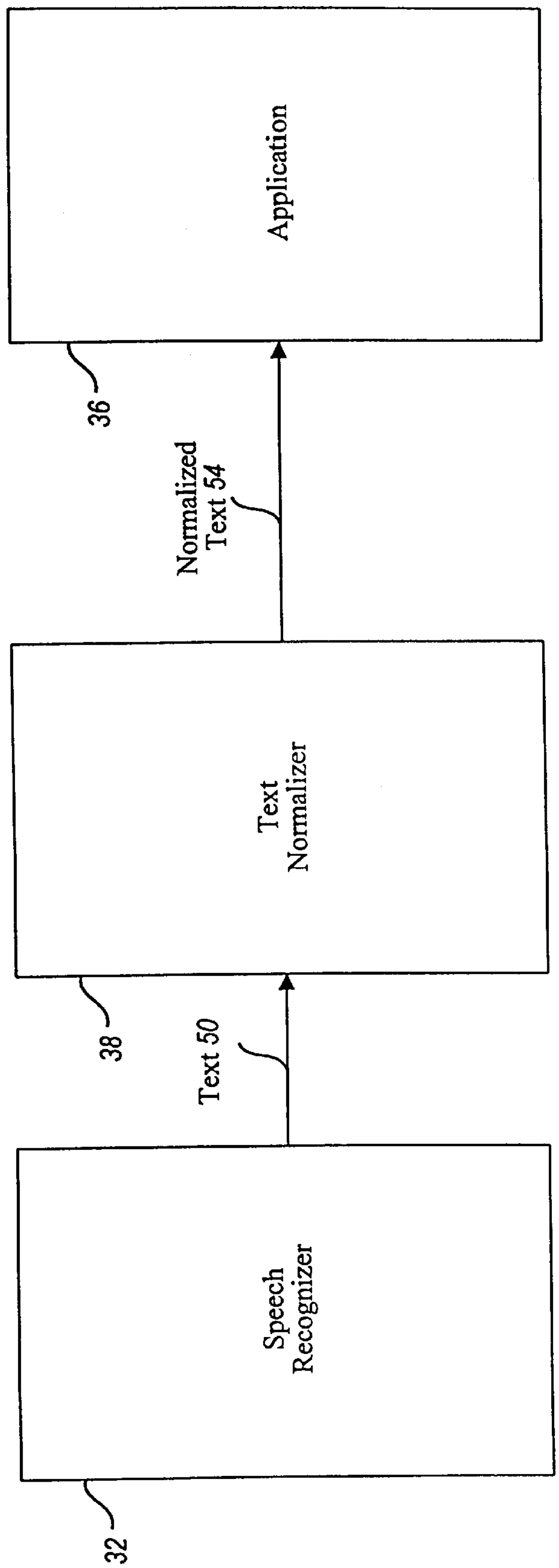
Figure 3C:
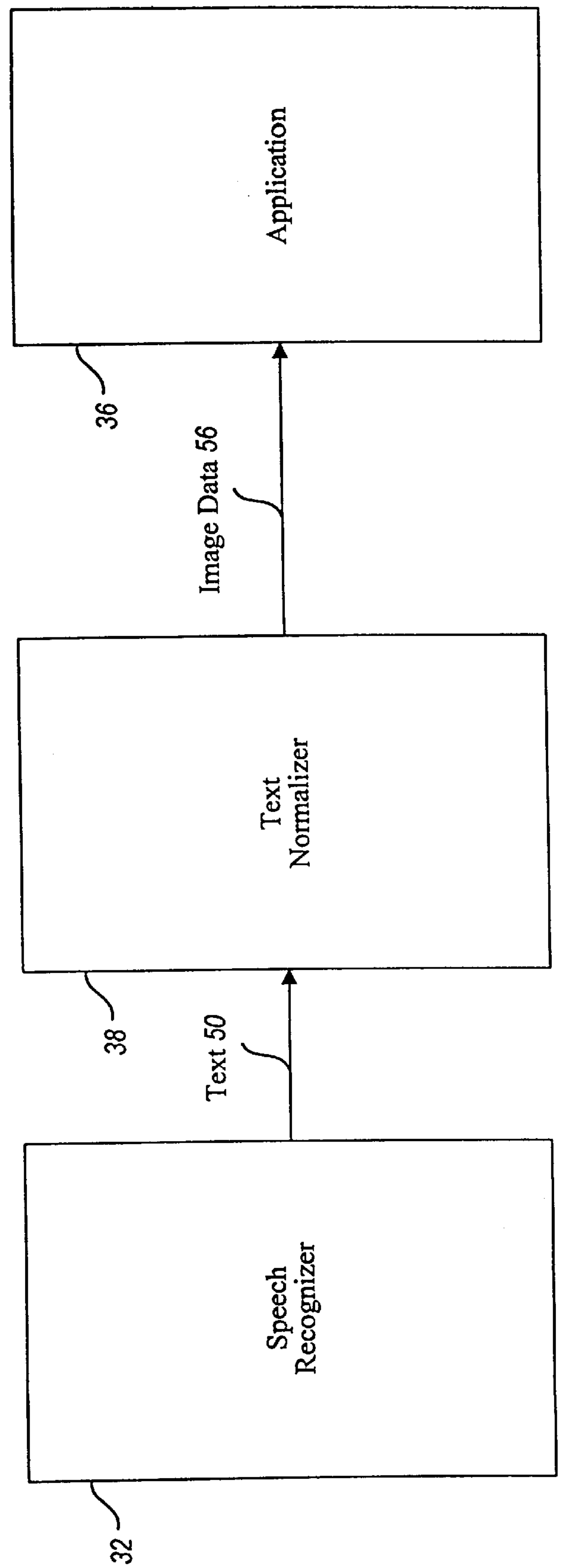

FIG. 3B shows an instance where the text normalizer 38 produces normalized text 54 that it passes to the application program 36. The normalized text 54 includes substitute text that replaces the text 50 that was output by the recognizer 32. However, as shown in FIG. 3C, the text normalizer 38 may, alternatively, normalize the text to produce image data 56, such as a bitmap, metafile, or other representation of an image to the application program 36. The text 50 may specify an identifier of the representation of the image. In this instance, the text normalizer 38 replaces the identifier with the actual representation of the image that is identified by the identifier.

Figure 3D:
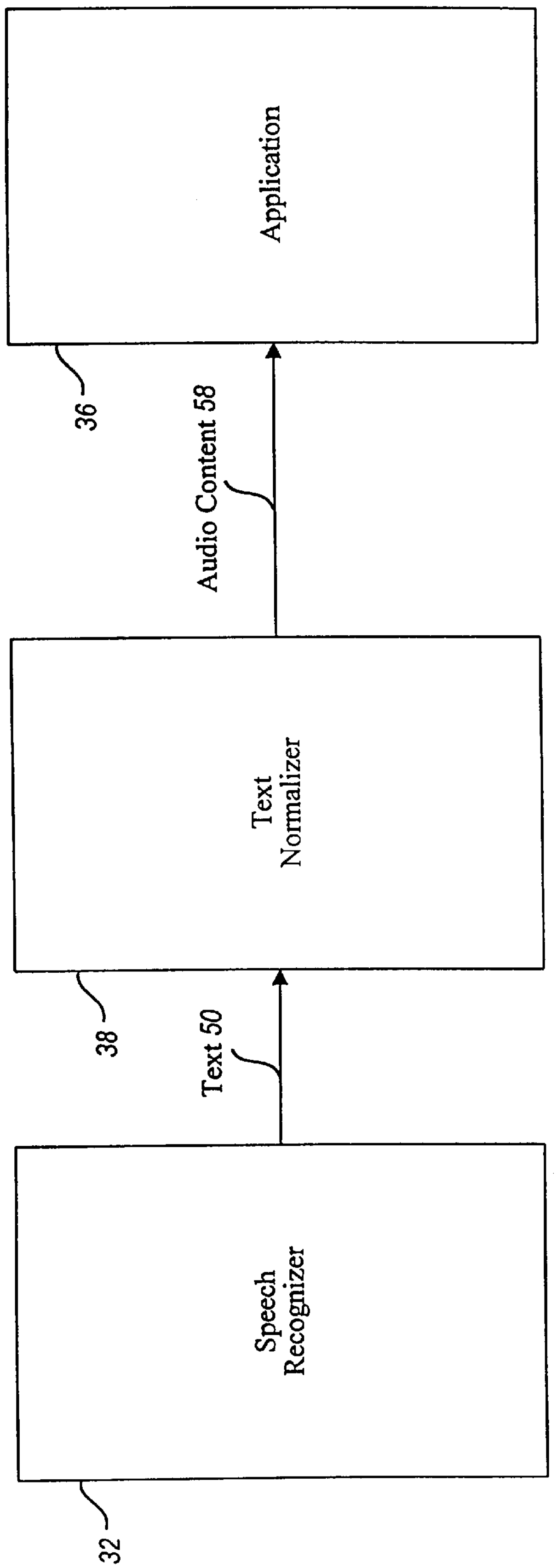

FIG. 3D shows an instance wherein the text normalizer 38 receives text 50 from the speech recognizer 32 and produces audio content 58 as the normalized content. In this case, the text 50 may identify an audio clip or a file that holds audio data. This identifier is replaced with the associated audio clip for a file when normalized. Alternatively, the text may be a word or phrase for which the text normalizer 38 has an audio representation and wishes to substitute the audio representation for the word or phrase.

Figure 3E:
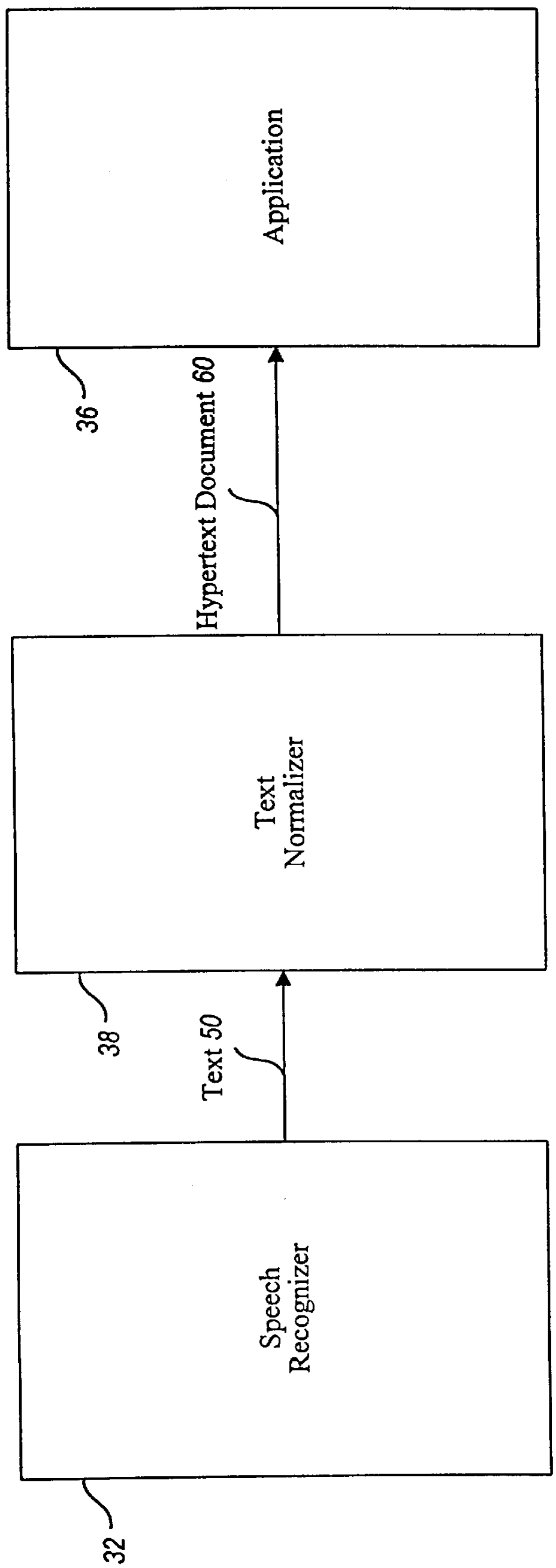

FIG. 3E depicts an instance wherein the text normalizer 38 receives text 50 from the speech recognizer 32 and outputs a hypertext document 60 to the application program 36. The text 50 may include an identifier, such as a uniform resource location (URL) that is associated with the hypertext document 60. When the text normalizer 38 receives the text 50 for normalization, it replaces the text with the associated hypertext document 60.

It should be appreciated that the text normalizer may combine different types of media content in the resulting normalized content 52 that is passed the application programs. It should also be appreciated that the text normalizer 38 may draw upon media content or resources within a network 44 to realize the normalization. For purposes of simplicity and clarity, the discussion below will focus on instances like that depicted in FIG. 3B wherein text 50 is normalized by the text normalizer 38 to produce normalized text 54.

Figure 4:
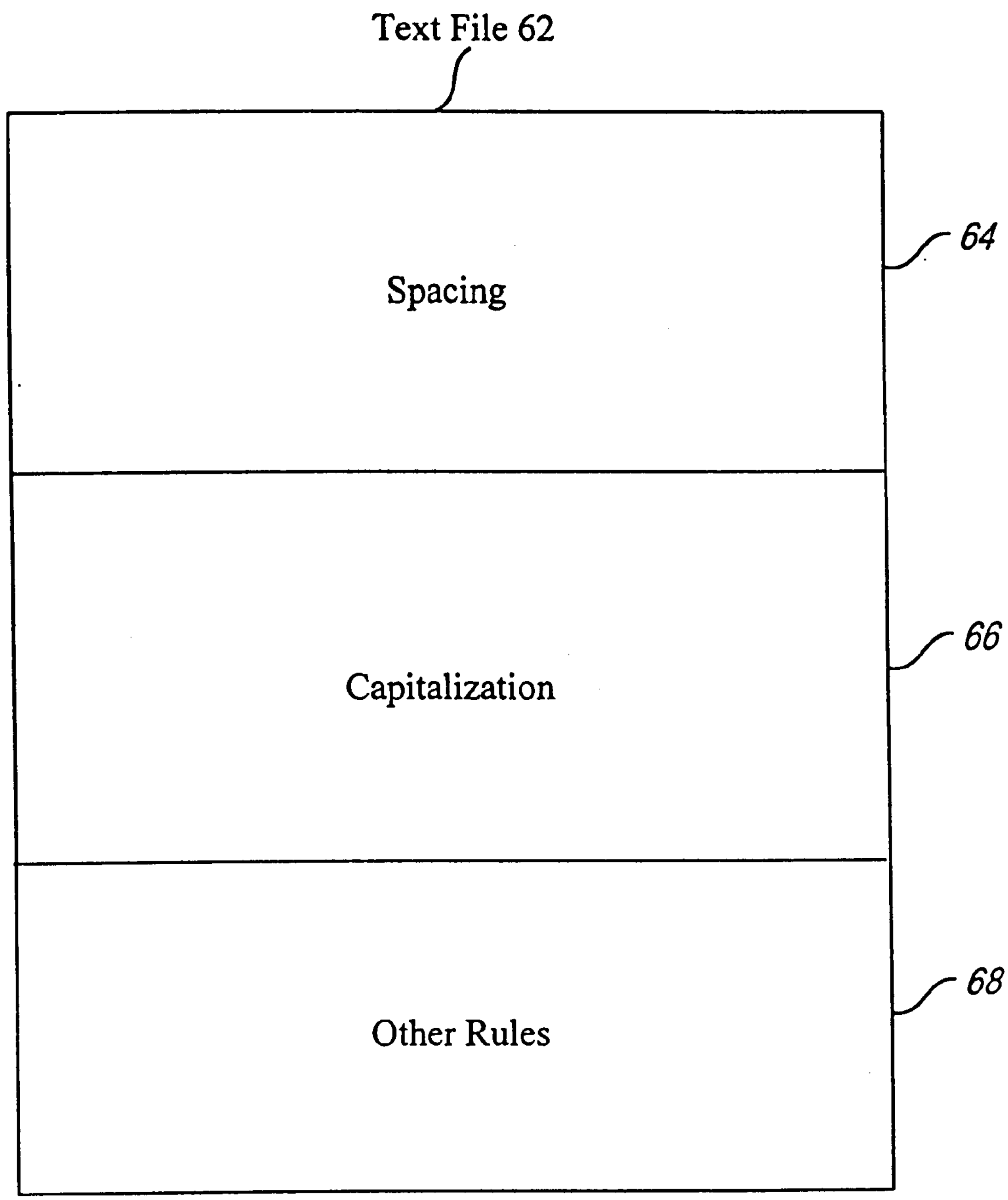
FIG. 4 illustrates the logical format of the text file that holds the context-free grammar.

As was mentioned above, the context-free grammar 40 is stored as a text file. The text file holds specification of the rules of the context-free grammar. FIG. 4 depicts a logical organization of the text file 62. The text file 62 is divided into three major sections 64, 66, and 68. Each of the sections is delineated by a header or tag within the text file 62 (e.g., "[spacing]," "[capitalization]," "[Rules]"). The first section is the spacing section 64 that specifies rules of the context-free grammar relative to spacing. These rules are implemented as a table. An example of a specification of rules within the table is as follows:

| left | right | substitution | switch |
|---|---|---|---|
| "." | " " | "00" | {1} |
| "." | " " | "0" | {!1} |

The table includes a "left" column that specifies a character that appears to the left, a "right" column that specifies a character that appears to the right, a "substitution" column that holds a proposed substitution for the right character, and a "switch" column that specifies whether the rule is in effect or not. The first rule in the above example specifies that if a period (i.e., the left character) is followed by a space (i.e., the right character), two spaces are to be substituted for the single space. The switch column holds a value of "1" and thus indicates that this rule is in effect. The second rule (specified underneath the first rule in the above example) indicates that a period is to be followed only a single space. The switch column, however, holds a value of "!1," which indicates that the rule is not in effect.

It should be noted that a user interface, such as a property sheet, may be provided to enable a user to choose which of the spacing rules are in effect or not. The user choices are used to set the switch fields within the table.

The capitalization section 66 is also organized as a table like that provided for the spacing section 64. This section 66 holds capitalization rules such as the first letter of a word following a period that ends a sentence is capitalized. These rules may be also implemented as switchable so that a user may choose capitalization options.

The third section is the other rule section 68. The other rule section holds specification of a number of different rules that do not concern capitalization or spacing. This section is delineated by a "Rules" heading or tag. An example of such a rule is as follows:

<Digits> = [1+] <0..9>
<0..9> = zero "0"
<0..9> = one "1"
. .
. .
. .
<0..9> = nine "9"

This rule indicates written digits may include one or more words containing digits and the rule specifies the substitution of digits for written digit strings (i.e., "1" for "one").

Figure 5:
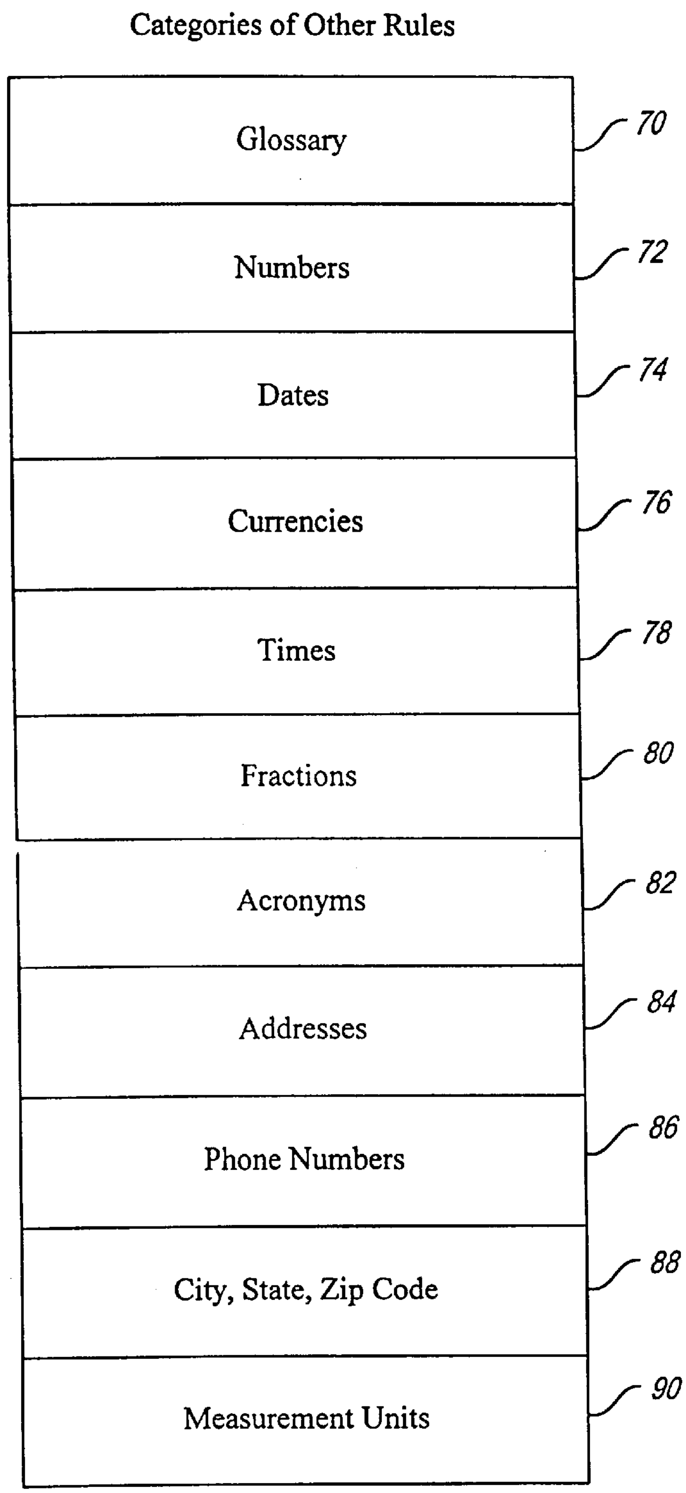
FIG. 5 depicts the categories of other rules that are set forth within the text file of FIG. 4.

FIG. 5 depicts the categories of other rules that may be implemented in accordance with the preferred embodiment of the present invention. The glossary category of rule 70 specifies the replacement of text with the substitute text. A user may type in such substitutions as part of the glossary to enable shorthand ways of adding text to a document. The numbers category 72 contains rules that specify the substitution of the written form of words (i.e., a string of words) with a digital representation composed solely of digits. For example, "one hundred forty seven" is replaced by "147" by application of rules in this category 72 of rules.

A dates category 74 contains rules that concern how spoken versions of dates are to be normalized. For example, the output text "april first nineteen ninety seven" is normalized to "Apr. 1, 1997."

The currencies category 76 holds rules that normalize the specification of monetary amounts. For example, the phrase "ten cents" may be normalized to "10¢" by rules in this category 76.

The times category 78 holds rules that are used to normalize specification of time. For instance, the text "four o'clock in the afternoon" may be normalized to "4 p.m." by rules within this category 78.

The fractions category 80 normalizes fractions into a mathematical form. Hence, the text "one-fourth" may be normalized to "¼" by rules in this category 80.

The acronyms category 82 normalizes text that specifies acronyms. For example, the text "CIA" may be normalized to "C. I. A." by rules in this category 82.

The addresses category 84 contains rules for normalizing the specification of addresses. For instance, the string "one hundred fifty sixth" may be normalized to "156th" by rules within this category 84.

The phone numbers category 86 normalizes the specification of phone numbers. When a user speaks a phone number, the speech recognizer may interpret the phone number as merely a sequence of digits. For example, the string "nine three six six three zero zero zero" may be normalized to "936-3000" by rules within this category 86.

The city, state, zip code category 88 holds rules for specifying how a sequence of city, state, and zip code should appear. For example, the text "Seattle Washington nine eight zero five two" may be normalized to "Seattle, Wash. 98052" by rules within this category 88.

The measurement units category 90 applies rules regarding the specification of measurements. For instance, the text "nineteen feet" will be normalized to "19 ft." by rules within this category 90.

Those skilled in the art will appreciate that the text file 62 may have a different format other that depicted within FIG. 4. Moreover, the text file 62 may include rules for substituting text with audio content or video content. Rules may also be included for substituting text with hypertext documents. Those skilled in the art will appreciate that the context-free grammar need not be specified as a text file in practicing the present invention.

Those skilled in the art will further appreciate that additional categories of rules other than those depicted in FIG. 5 may be utilized. Still further, fewer categories of rules or different categories of rules may apply other than those depicted in FIG. 5.

Figure 6:
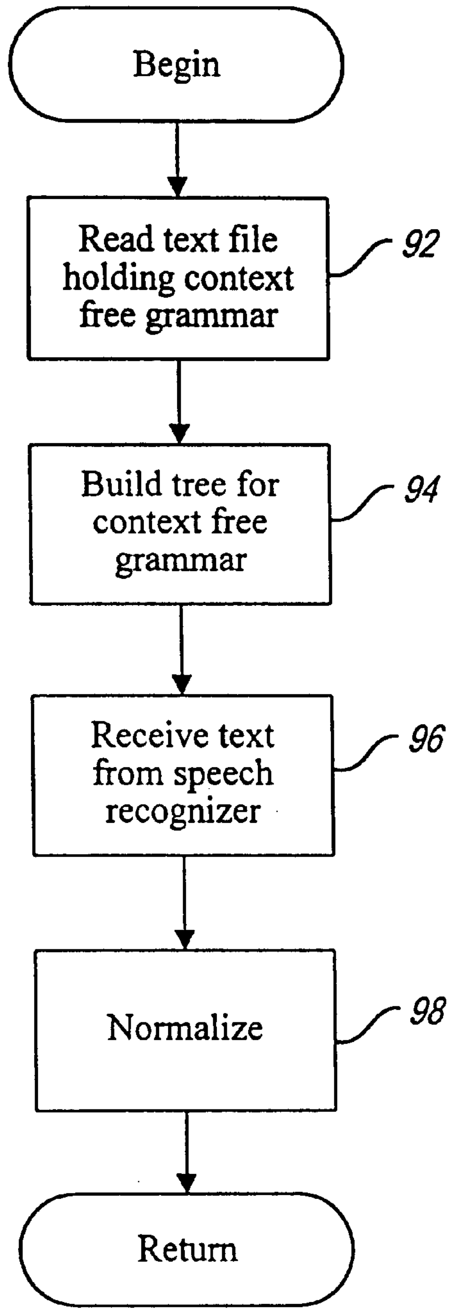
FIG. 6 is a flow chart illustrating the steps that are performed to use the text file for normalizing text.

In order to utilize the context-free grammar 40, the text file 62 must be read and processed. FIG. 6 is a flowchart that depicts the steps that are performed to utilize the context-free grammar in normalizing text. First, the text file 62 that holds the context-free grammar is read (step 92 in FIG. 6). The content held therein are used to build a tree representation for the context-free grammar (step 94 in FIG. 6). This tree representation is used in parsing the input text received from the speech recognizer 32. Each path of the tree specifies a portion of a rule for normalizing text. Thus, the text received from the speech recognizer 32 is processed by the text normalizer 38 to compare the text with the rules contained within the tree and perform the appropriate normalization. Accordingly, text is received from the speech recognizer (step 96 in FIG. 6) and normalized (step 98 in FIG. 6). The tree acts largely as a parsing mechanism for deciding what portions of text received from the speech recognizer 32 should be normalized and how these portions should be normalized.

Figure 7:
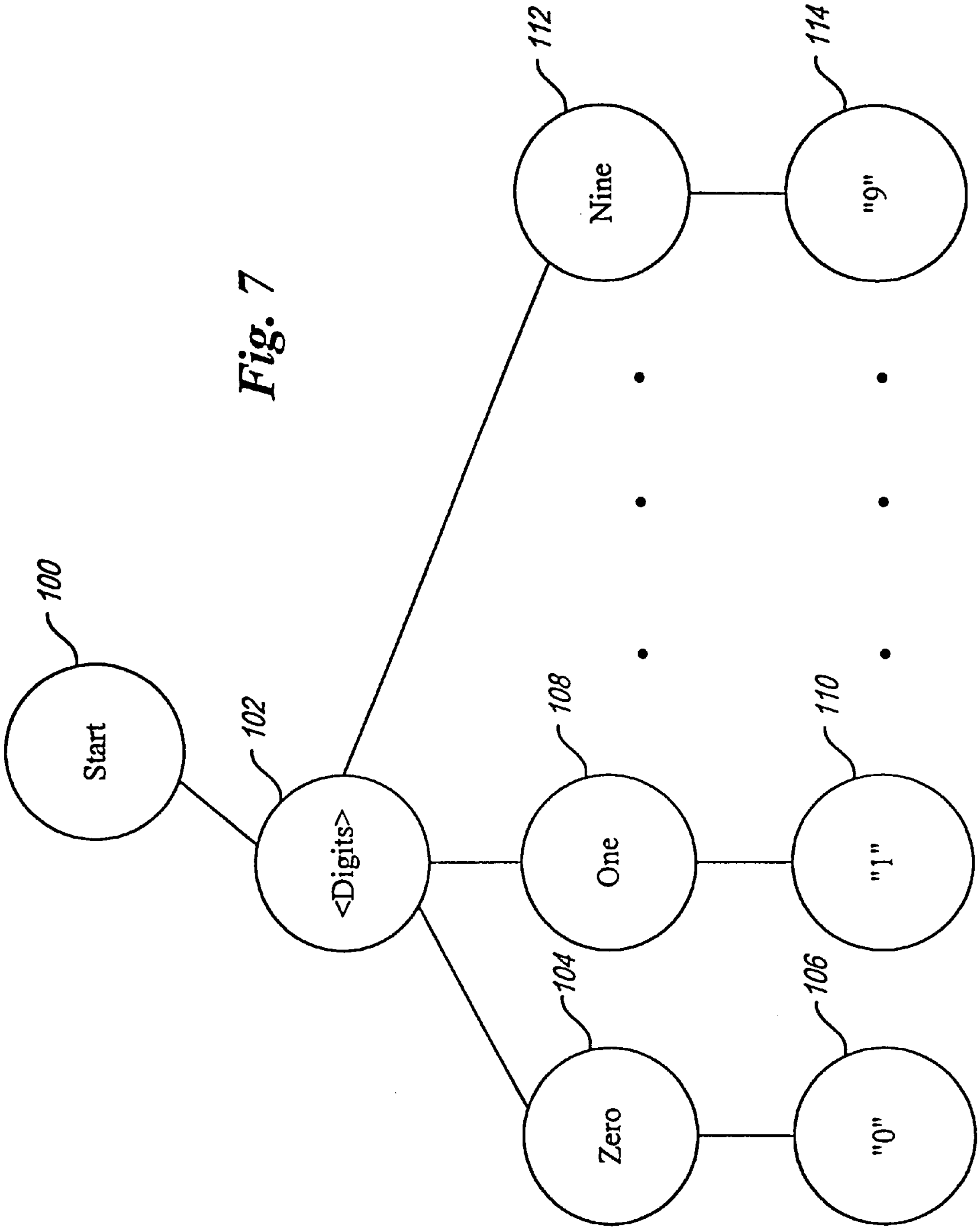
FIG. 7 depicts an example portion of the tree for the context-free grammar.

FIG. 7 shows an example of a portion of the tree that is built by reading rules from the text file. The tree may be stored in binary form for optimization. This subtree specifies portions of the "Digits" rule that was set forth above as an example of rules provided within the text file 62. The tree includes a start rule node 100 followed by a digits rule node 102. Nodes 104 and 106 specify that if the received text is "zero" the text is to be normalized and replaced with "0." Similarly, nodes 108, 110, 112, and 114 indicate the substitutions of "1" for "one" and "9" for "nine," respectively.

An example is helpful in illustrating how the subtree depicted in FIG. 7 may be used. Suppose that the text normalizer 38 receives the string "zero" the text normalizer starts at the start rule 100 and then determines that the string "zero" specifies a digit. It then follows the path to node 104 and determines that there is a match. The text normalizer then uses the substitute or normalized string "0" specified in node 106 to normalize the received string.

Figure 8:
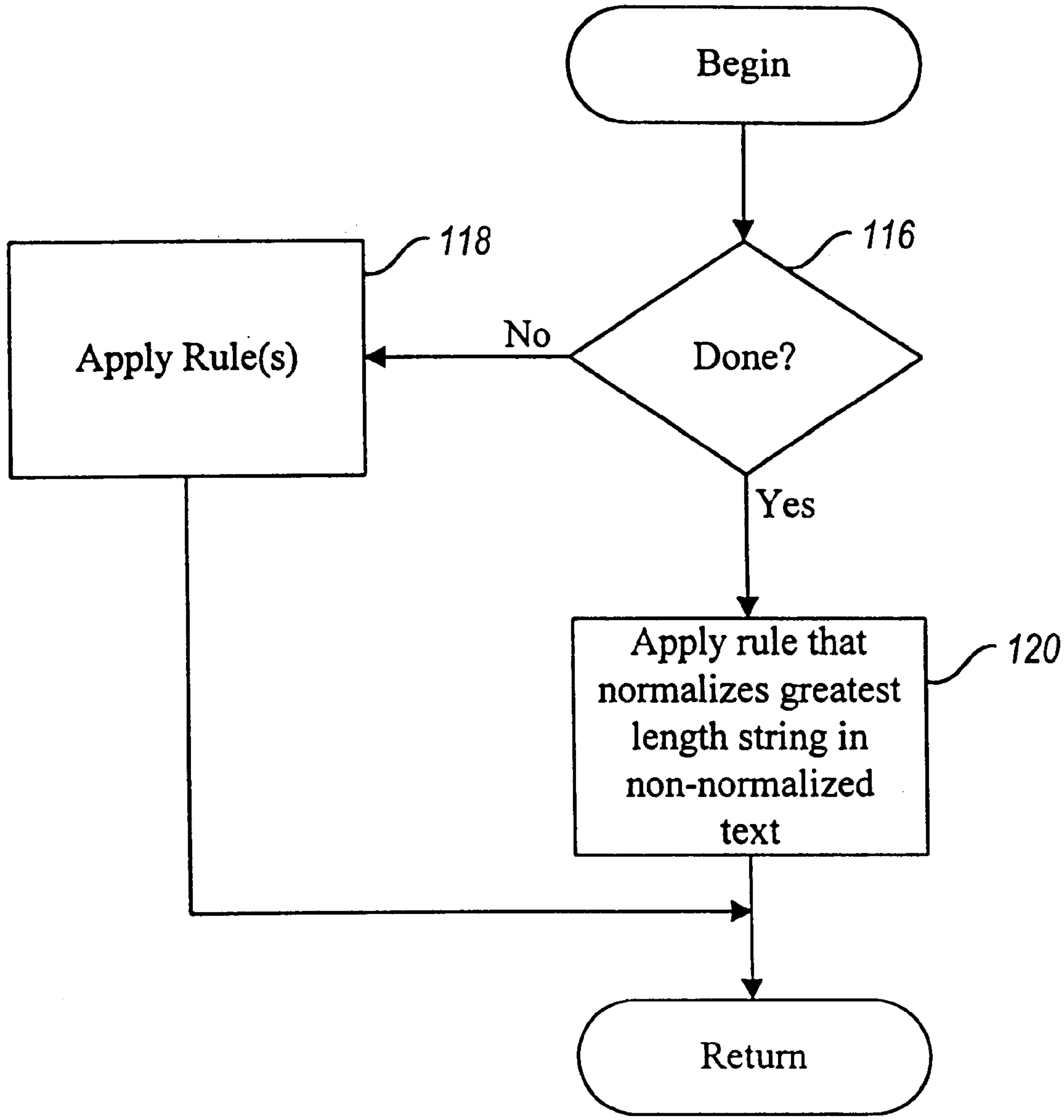
FIG. 8 is a flow chart illustrating the steps that are performed to determine when to apply a rule from the context-free grammar.

The rules are not necessarily applied on a word-by-word basis. Instead, the system seeks to apply the rule that will normalize the greatest length string within the text received from the speech recognizer 32. FIG. 8 is a flowchart illustrating the steps that are performed in applying the rules. In general, a rule will be applied when at least a complete rule has been identified and no further portion of a rule can be applied. Thus, in step 116 of FIG. 8, the text normalizer determines whether it is done normalizing a given portion of a text. If the text normalizer is done (see step 116 in FIG. 8), the text normalizer applies the rule that normalizes the greatest length of string in the non-normalized text (step 120 in FIG. 8). It should be noted that there may be instances where multiple rules apply and there has to be a criteria for determining which rule to actually utilize. The preferred embodiment of the present invention utilizes the rule that normalizes the greatest portion of the non-normalized string. If, however, it is determined that there is further application of the rules to be done (see step 116 in FIG. 8), then the additional portions of the rules are applied (step 118 in FIG. 8).

Figure 9:
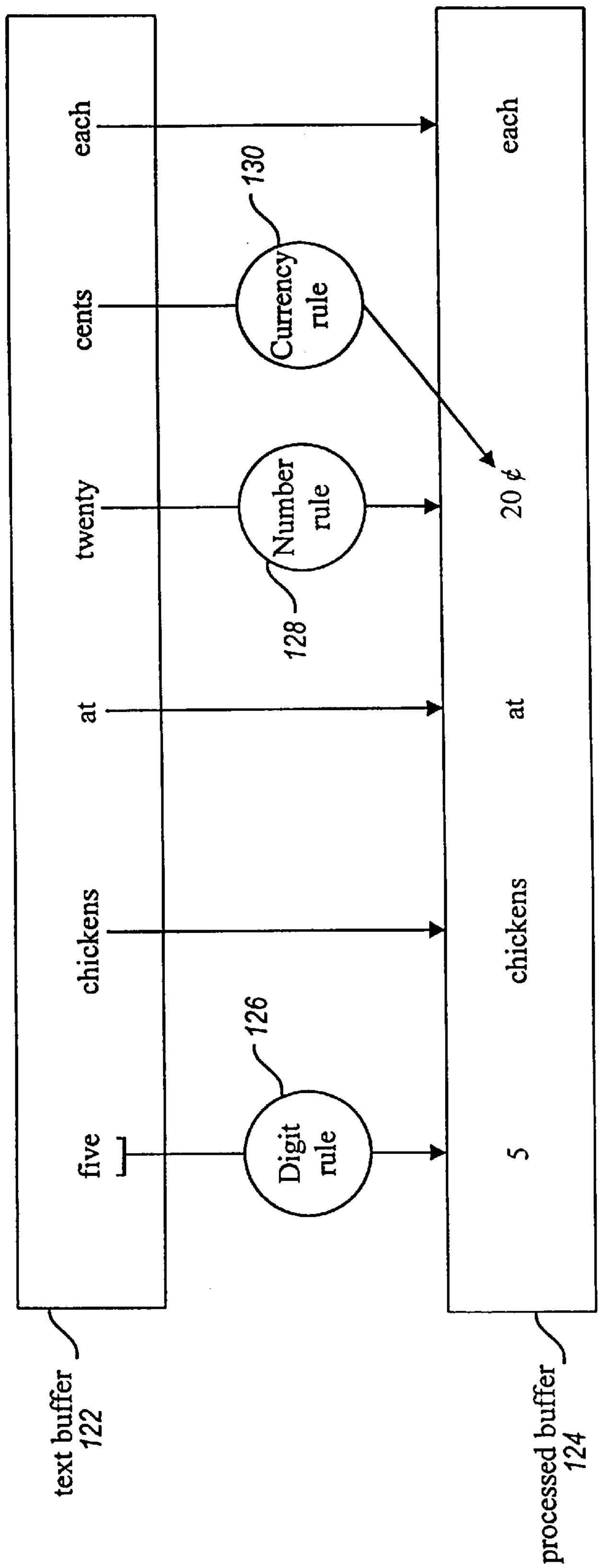
FIG. 9 depicts an example of normalization of a portion of text.

An example is helpful in illustrating when rules are applied and how normalization is performed. FIG. 9 depicts an example of text string "five chickens at twenty cents each." These words are stored within a text buffer 122 that is used by the text normalizer 38. The first word, "five," is processed by the text normalizer to determine whether there are any matching rules or not. There will be a match within the digit rule 126 for this word. Before applying the rule, the text normalizer 38 looks at the next word "chickens" as there is no rule that applies to the phrase "five chickens," the text normalizer 38 knows that it is done (see step 116 in FIG. 8) and applies the digit rule to replace "five" with "5." The value "5" is stored in a processed buffer 124 that holds the normalized text output.

The system has no rule for "chickens" and thus does not pass the word on to the processed buffer 124. Similarly, the text normalizer 38 has no rule for the word "at" and thus would pass the word "at" on to the process buffer 124. When the text normalizer 38, however, encounters "twenty," it has a rule that applies (a number rule 128). Before actually using the rule, the text normalizer 38 looks at the next word "cents" and determines that there is no rule that normalizes the phrase "twenty cents." As a result, the number rule 128 is applied to replace "twenty" with "20." Subsequently, a currency rule 130 is applied to replace "cents" with "¢." Lastly, the word "each" is not normalized and is passed in literal form to the process buffer 124.

Figure 10:
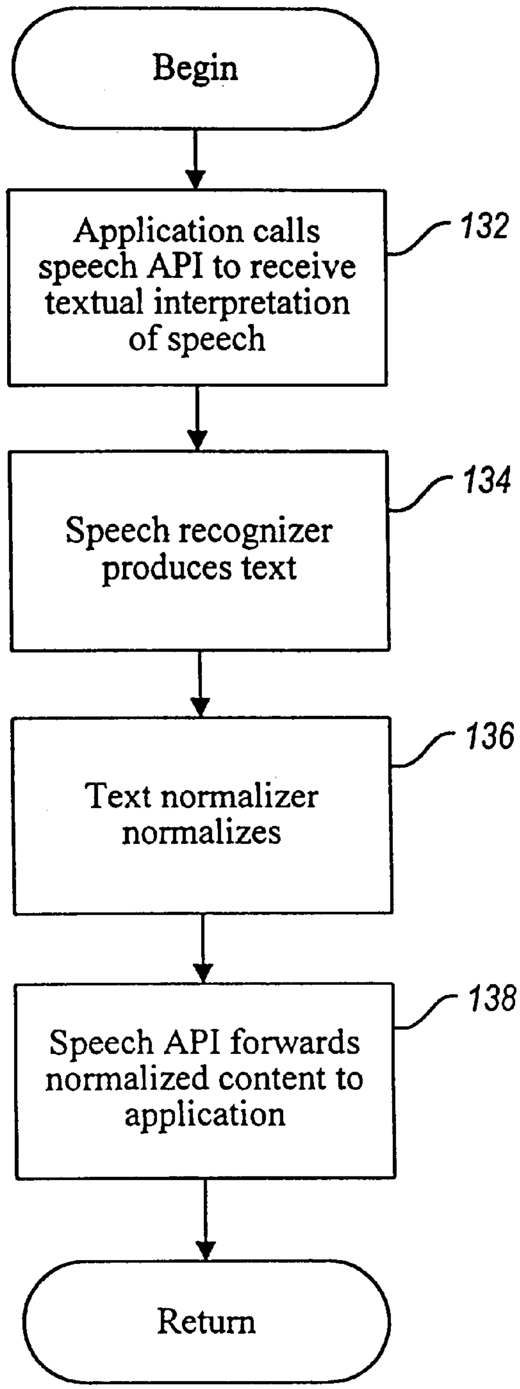
FIG. 10 is a flow chart illustrating the steps that are performed for an application program to receive normalized text.

As was mentioned above, the text normalizer 38 is used within the speech API 34. FIG. 10 is a flow chart that depicts the steps of how the text normalizer is used in this context. Initially, an application program 36 calls the speech API 34 to receive textual interpretation of input speech (step 132 in FIG. 10). A speech recognizer processes the speech input to produce a textual output (step 134 in FIG. 10). The text normalizer 38 then normalizes the text as has been described above (step 138 in FIG. 10). The speech API 34 forwards the normalized content to the requesting application program 36 (step 138 in FIG. 10).

Figure 11:
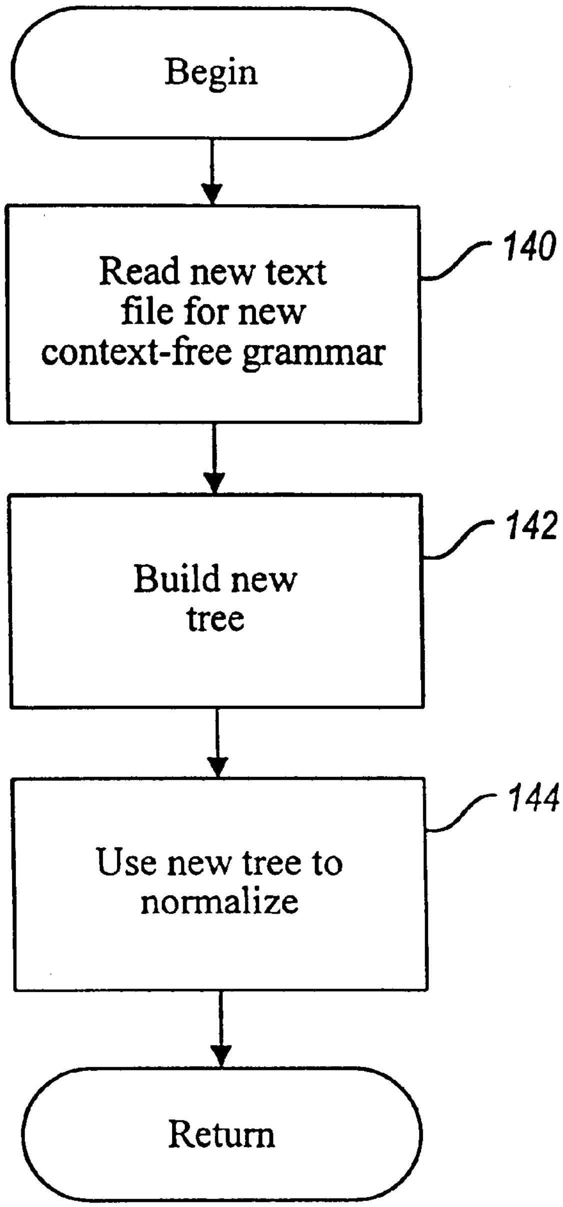
FIG. 11 is a flow chart illustrating the steps that are performed to replace one context-free grammar with another.

The preferred embodiment of the present invention has the benefit of being flexible and extensible. The context-free grammar is extensible in that content may be changed, added, or a complete new context-free grammar may be specified. FIG. 11 is a flow chart illustrating the steps that are performed to replace the context-free grammar with a new context-free grammar. The existing context-free grammar may be replaced by providing a new text file. A new text file holds specification for the new context-free grammar. The computer system 10 then reads the new text file for the context-free grammar (step 140 in FIG. 11). The information within the text file is utilized to build a new tree for the new context-free grammar (step 142 in FIG. 11). The new tree is then used to normalize text (step 144 in FIG. 11).

Figure 12:
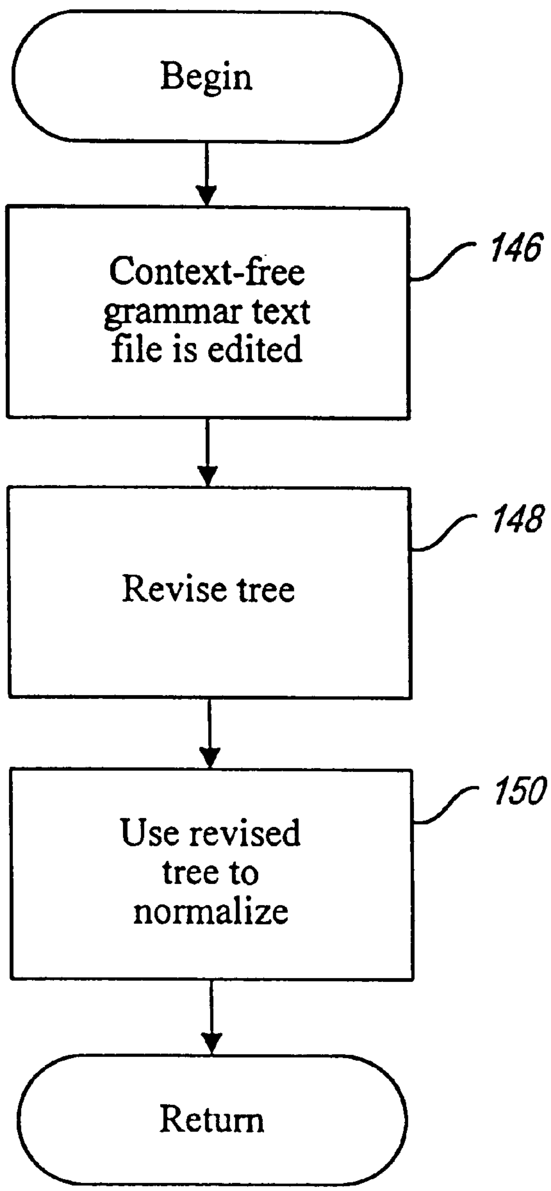
FIG. 12 is a flow chart illustrating the steps that are performed to edit a context-free grammar.

The entire text file need not be replaced each time the user wishes to change the context-free grammar. Instead, the text file may be merely edited. FIG. 12 is a flow chart illustrating the steps that are performed to alter the context-free grammar in this fashion. Initially, the context-free grammar checks file as edited (step 146 in FIG. 12). The tree is revised accordingly by reading the contents from the edited text file altering the tree in a matching fashion (step 148 in FIG. 12). The revised tree may then be utilized to normalized text (step 150 in FIG. 12).

While the present invention has been described with reference to a preferred embodiment thereof, those skilled in the art will appreciate that various changes in the form and detail may be made without departing from the intended scope of the present invention as defined in the appended claims. For example, the text normalization may generally be applied to substitute textual content with any of a number of different types of media. Moreover, the text normalizer need not be part of a speech API or part of system provided resources.

We claim:

1. In a computer system having a speech recognition engine for recognizing content in input speech, a method comprising the computer-implemented steps of:

receiving text corresponding to speech input from the speech recognition engine;

applying a context-free grammar to identify substitute content for the received text; and substituting the text with the substitute content.

2. The method of claim 1 wherein the substitute content comprises an alphanumeric string.

3. The method of claim 1 wherein the substitute content comprises graphical content.

4. The method of claim 1 wherein the received text is an identifier of media content in a distributed system and the substitute content is the media content.

5. The method of claim 4 wherein the received text is a uniform resource locator (URL).

6. The method of claim 5 wherein the substitute content is a hypertext document.

7. The method of claim 1 wherein the substitute content is a hypertext document.

8. The method of claim 1 wherein the substitute context comprises audio content.

9. The method of claim 1 wherein the context-free grammar contains at least one rule for substituting the substitute content for the received text.

10. The method of claim 1 wherein the computer system runs an application program and wherein the substitute content is forwarded to the application program.

11. The method of claim 1 wherein the received text is a string of words and the substitute content contains a series of digits corresponding to at least some of the string of words.

12. The method of claim 1 wherein the received text is a string of words specifying an address and the substitute content includes a series of digits specifying at least a portion of the address.

13. The method of claim 1 wherein the received text is a string of words identifying an amount of currency and the substitute content includes digits and a currency symbol that specifies the amount of currency.

14. The method of claim 1 wherein the received text is a string of words that specifies a fraction and the substitute content includes digits and a mathematical operation that in conjunction specify the fraction.

15. In a computer system having a speech recognizer for recognizing portions of speech in speech input, a method comprising the computer-implemented steps of:

providing a file that sets forth rules of a context-free grammar for normalizing text;

receiving text from the speech recognizer, said text corresponding to speech input; and normalizing at least a portion of said text to replace the portion of said text with a normalized alphanumeric string, said normalizing comprising applying a rule from the context-free grammar to replace the portion of said text being normalized with the normalized alphanumeric string.

16. The method of claim 15, further comprising the steps of replacing the file with a substitute file that sets forth rules of a different context-free grammar and using the different context-free grammar to normalize new text.

17. The method of claim 15, further comprising the step of using the file to build a tree for the context-free grammar that is used in the normalizing.

18. The method of claim 15 wherein the file is a text file.

19. The method of claim 15 wherein the file includes rules regarding capitalization.

20. The method of claim 15 wherein the file includes rules regarding spacing.

21. The method of claim 15 wherein the file contains specification of a switch that identifies whether or not a rule is to be used as part of the context-free grammar.

22. The method of claim 15, further comprising the step of altering contents of the file so as to change the context-free grammar.

23. The method of claim 15, further comprising the steps of receiving additional text and normalizing the additional text by applying another rule from the context-free grammar to replace the additional text with non-textual content.

24. The method of claim 23 wherein the non-textual content includes image data.

25. The method of claim 23 wherein the non-textual content includes audio data.

26. In a computer system having an application program and a speech recognizer for recognizing portions of speech in speech input and outputting text corresponding to the recognized portions of speech, a method comprising the computer implemented steps of:

providing an application program interface (API) that includes a text normalizer;

receiving text from the speech recognizer at the text normalizer;

normalizing the text by applying a rule from a context-free grammar to alter contents of the text and produce normalized text; and passing the normalized text to the application program.

27. The method of claim 26 wherein the API is a speech API that provides textual output corresponding to recognized speech input to the application program.

28. The method of claim 26 wherein the application program requests text from the API to prompt the passing of the normalized text to the application program.

29. A computer system, comprising:

a speech recognizer for recognizing portions of speech in speech input and producing textual output corresponding to the recognized portions of speech;

a context-free grammar that contains rules for normalizing text; and a text normalizer that applies at least one rule from the context-free grammar to the textual output from the speech recognizer.

30. The computer system of claim 29 wherein the text normalizer is part of an application program interface (API).

31. In a system having a speech recognition engine for recognizing content in input speech, a computer-readable medium holding computer-executable instructions for performing a method comprising the computer-implemented steps of:

receiving text corresponding to speech input from the speech recognition engine;

applying a context-free grammar to identify substitute content for the received text; and substituting the text with the substitute content.

32. The computer-readable medium of claim 31 wherein the substitute content comprises an alphanumeric string.

33. The computer-readable medium of claim 31 wherein the substitute content comprises graphical content.

34. The computer-readable medium of claim 31 wherein the received text is an identifier of media content in a distributed system and the substitute content is the media content.

35. The computer-readable medium of claim 34 wherein the received text is a uniform resource locator (URL).

36. The computer-readable medium of claim 35 wherein the substitute content is a hypertext document.

37. The computer-readable medium of claim 31 wherein the substitute content is a hypertext document.

38. The computer-readable medium of claim 31 wherein the substitute content comprises audio content.

39. The computer-readable medium of claim 31 wherein the received text is a string of words and the substitute content contains a series of digits corresponding to at least some of the string of words.

40. The computer-readable medium of claim 31 wherein the received text is a string of words specifying an address and the substitute content includes a series of digits specifying at least a portion of the address.

41. The computer-readable medium of claim 31 wherein the received text is a string of words identifying an amount of currency and the substitute content includes digits and a currency symbol that specifies the amount of currency.

42. The computer-readable medium of claim 31 wherein the received text is a string that specifies a fraction and the substitute content includes digits and a mathematical operation that in conjunction specify the fraction.

43. In a computer system having a speech recognizer for recognizing portions of speech in speech input, a computer-readable medium holding computer-executable instructions for performing a method comprising the computer-implemented steps of:

providing a file that sets forth rules of a context-free grammar for normalizing text;

receiving text from the speech recognizer, said text corresponding to speech input; and normalizing at least a portion of said text to replace the portion of said text with a normalized alphanumeric string, said normalizing comprising applying a rule from the context-free grammar to replace the portion of said text being normalized with the normalized alphanumeric string.

44. The computer-readable medium of claim 43 wherein the method further comprises the steps of replacing the file with a substitute file that sets forth rules of a different context-free grammar and using the different context-free grammar to normalize new text.

45. The computer-readable medium of claim 43 wherein the file is a text file.

46. The computer-readable medium of claim 43 wherein the file contains specification of a switch that identifies whether or not a rule is to be used as part of the context-free grammar.

47. The computer-readable medium of claim 43 wherein the method further comprises the step of altering contents of the file to change the context-free grammar.

48. In a computer system having an application program and a speech recognizer for recognizer portions of speech in speech input and outputting text corresponding to the recognized portions of speech, a computer-readable medium holding computer-executable instructions for performing a method comprising the computer-implemented steps of:

providing an application program interface (API) that includes a text normalizer;

receiving text from the speech recognizer at the text normalizers;

normalizing the text by applying the rule from a context-free grammar to alter contents of the text and produce normalized text; and passing the normalized text to the application program.

49. The computer-readable medium of claim 48 wherein the API is a speech API that provides textual output correspond to recognized speech input to the application program.

50. The computer-readable medium of claim 48 wherein the application program requests text from the API to prompt the passing of the normalized text to the application program.

* * * * *

UNITED STATES PATENT AND TRADEMARK OFFICE

CERTIFICATE OF CORRECTION

PATENT NO. : 5,970,449

DATED : October 19, 1999

INVENTOR(S) : Alleva et al.

It is certified that error appears in the above-identified patent and that said Letters Patent is hereby corrected as shown below:

Column 1, line 48, replace "receive" with --received--.

Column 8, line 18, replace "process" with --processed--.

Column 8, line 27, replace "process" with --processed--.

Column 11, line 28, after "string" insert --of words--.

Column 12, line 28, replace "normalizers" with --normalizer--.

Signed and Sealed this

Third Day of April, 2001

Attest:

NICHOLAS P. GODICI

*Attesting Officer*

*Acting Director of the United States Patent and Trademark Office*